(12) United States Patent
Kaun et al.

(10) Patent No.: US 10,843,397 B2
(45) Date of Patent: Nov. 24, 2020

(54) COEXTRUSION ADAPTER

(71) Applicant: REIFENHÄUSER GMBH & CO. KG MASCHINENFABRIK, Troisdorf (DE)

(72) Inventors: Achim Kaun, Neunkirchen (DE); Lars Bergheim, Niederkassel (DE)

(73) Assignee: REINFENHAUSER GMBH & CO. KG MASCHINENFABRIK, Troisdorf (DE)

( * ) Notice: Subject to any disclaimer, the term of this patent is extended or adjusted under 35 U.S.C. 154(b) by 505 days.

(21) Appl. No.: 15/442,902

(22) Filed: Feb. 27, 2017

(65) Prior Publication Data

US 2017/0259483 A1 Sep. 14, 2017

(30) Foreign Application Priority Data

Mar. 11, 2016 (EP) .................................... 16159939

(51) Int. Cl.
*B29C 48/30* (2019.01)
*B29C 48/31* (2019.01)
(Continued)

(52) U.S. Cl.
CPC .............. *B29C 48/30* (2019.02); *B29C 48/08* (2019.02); *B29C 48/21* (2019.02);
(Continued)

(58) Field of Classification Search
CPC ...... H05K 3/4058; B32B 15/08; B32B 37/26; B32B 37/06
See application file for complete search history.

(56) References Cited

U.S. PATENT DOCUMENTS 3,832,120 A * 8/1974 Shaffer .................. B29C 48/30
425/466
3,877,857 A * 4/1975 Melead .................. B29C 48/30
425/133.5
(Continued)

FOREIGN PATENT DOCUMENTS

CN 201427388 Y * 3/2010
CN 104512029 A 4/2015
(Continued)

OTHER PUBLICATIONS

Machine Translation CN201427388 (Year: 2006).*
(Continued)

*Primary Examiner* — Matthew J Daniels
*Assistant Examiner* — Wayne K. Swier
(74) *Attorney, Agent, or Firm* — Pauley Erickson & Swanson

(57) ABSTRACT

A coextrusion adapter, including a central conduit having an inlet end and an outlet end and having bottom and top walls that define the height of the central conduit and side walls that define the width of the central conduit, as well as at least one coextrusion conduit having an inlet end and an outlet end. The outlet end feeds into the central conduit near or in the vicinity of the bottom and/or top wall thereof, downstream of the inlet end of the central conduit, and adjusting devices are provided, which are allocated to each outlet end of the at least one coextrusion conduit and are composed of a plurality of adjusting elements, which collectively extend across the width of the outlet end and by actuating drives, are adjustable independently of one another so that it is possible to change the inner width of the respective width section of the outlet end. Adjacent to the outlet end at least one of the side walls has a receiving bore into which it is possible to
(Continued)

insert a displacing element that protrudes beyond the side wall into the central conduit.

11 Claims, 7 Drawing Sheets

(51) Int. Cl.
| | | |
|---|---|---|
| *B29C 48/21* | (2019.01) | |
| *B29C 48/305* | (2019.01) | |
| *B29C 48/255* | (2019.01) | |
| *B29C 48/08* | (2019.01) | |
| *B29C 48/92* | (2019.01) | |
| *B32B 27/08* | (2006.01) | |
| *B29C 48/07* | (2019.01) | |
| *B29C 48/49* | (2019.01) | |

(52) U.S. Cl.
CPC ........ *B29C 48/2556* (2019.02); *B29C 48/307* (2019.02); *B29C 48/31* (2019.02); *B29C 48/313* (2019.02); *B29C 48/92* (2019.02); *B29C 48/07* (2019.02); *B29C 48/49* (2019.02); *B29C 2948/92628* (2019.02); *B29C 2948/92647* (2019.02); *B29C 2948/92904* (2019.02); *B32B 27/08* (2013.01)

(56) References Cited

U.S. PATENT DOCUMENTS

| | | | |
|---|---|---|---|
| 4,289,560 A | 9/1981 | Simons | |
| 4,348,346 A * | 9/1982 | Thompson | B29C 48/30 |
| | | | 264/146 |
| 4,784,815 A | 11/1988 | Cloeren et al. | |
| 5,120,484 A * | 6/1992 | Cloeren | B29C 47/0021 |
| | | | 264/173.12 |
| 6,338,453 B1 | 1/2002 | Meyer | |
| 6,612,829 B2 | 9/2003 | Rübhausen | |
| 6,666,998 B2 | 12/2003 | Berghaus et al. | |
| 6,752,348 B2 | 6/2004 | Dreckmann et al. | |
| 6,954,983 B2 | 10/2005 | Fröschl et al. | |
| 6,991,758 B2 | 1/2006 | Krumm et al. | |
| 7,025,303 B2 | 4/2006 | Meyer | |
| 7,036,763 B2 | 5/2006 | Böhm et al. | |
| 7,093,785 B2 | 8/2006 | Meyer et al. | |
| 7,384,254 B2 * | 6/2008 | Rubhausen | B29C 48/92 |
| | | | 425/133.5 |
| 7,445,443 B2 | 11/2008 | Meyer | |
| 7,479,003 B2 | 1/2009 | Wedell et al. | |
| 8,430,727 B2 | 4/2013 | Spirgatis et al. | |
| 9,187,282 B2 | 11/2015 | Meyer | |
| D744,666 S | 12/2015 | Weber | |
| 9,216,534 B2 * | 12/2015 | Truscott | B29C 47/0816 |
| 9,284,122 B2 | 3/2016 | Meyer et al. | |
| 9,808,980 B2 * | 11/2017 | Truscott | B29C 47/06 |
| 2002/0086071 A1 | 7/2002 | Rubhausen | |
| 2002/0180111 A1 | 12/2002 | Steinberg et al. | |
| 2004/0166192 A1 | 8/2004 | Stommel | |
| 2010/0136152 A1 | 6/2010 | Spirgatis et al. | |
| 2010/0143516 A1 | 6/2010 | Spirgatis et al. | |
| 2010/0295207 A1 | 11/2010 | Thewes et al. | |
| 2012/0313288 A1 | 12/2012 | Meyer et al. | |
| 2012/0321733 A1 * | 12/2012 | Lauwers | B29C 47/065 |
| | | | 425/113 |
| 2013/0028999 A1 | 1/2013 | Thewes et al. | |
| 2015/0328806 A1 | 11/2015 | Meyer | |
| 2016/0167907 A1 | 6/2016 | Meyer | |
| 2016/0185026 A1 | 6/2016 | Bending et al. | |

FOREIGN PATENT DOCUMENTS

| | | | | |
|---|---|---|---|---|
| DE | 3405744 A1 * | 8/1985 | ........... | B29C 48/307 |
| DE | 20 2004 011742 U1 | 10/2004 | | |
| EP | 0161812 A2 * | 11/1985 | ............ | B29C 48/30 |
| EP | 0 315 304 A1 | 5/1989 | | |
| EP | 1 621 320 A1 | 2/2006 | | |
| EP | 2 862 693 A1 | 4/2015 | | |
| EP | 2862693 A1 * | 4/2015 | ......... | B29C 47/0816 |
| EP | 2 949 448 A1 | 12/2015 | | |
| JP | 2014-162186 A | 9/2014 | | |

OTHER PUBLICATIONS

Machine Translation DE3405744 (Year: 1985).*
Machine Translation EP0161812 (Year: 1985).*
Co-pending U.S. Appl. No. 15/366,694, Thorsten Weber et. al, Method for Continuous Recycling of Scraps of Fiber and Cloth That Are Based on Thermoplastic Materials, filed Dec. 1, 2016.
Chinese Patent Office, Second Office Action of Chinese Patent Application No. 201710146740.X, dated May 20, 2019 (5 pages).

* cited by examiner

COEXTRUSION ADAPTER

BACKGROUND OF THE INVENTION

Field of the Invention

This invention relates to a coextrusion adapter, such as for an extrusion system equipped with a plurality of extruders and a die that is fed by them in order to produce a coextrusion composite out of a thermoplastic material. Such a coextrusion adapter includes a central conduit having an inlet end for connecting to an extruder and an outlet end for connecting to the die as well as bottom and top walls that define the height of the central conduit and side walls that define the width of the central conduit. The coextrusion adapter also includes at least one coextrusion conduit having an inlet end and an outlet end. The inlet end can be respectively connected to another extruder and the outlet end feeds into the central conduit downstream of the inlet end of the central conduit and adjusting devices are provided and allocated to each outlet end of the at least one coextrusion conduit and are composed of a plurality of adjusting elements, which collectively extend across the width of the outlet end and by actuating drives, are adjustable independently of one another so that it is possible to change the inner width of the respective width section of the outlet end.

Discussion of Related Art

Coextrusion adapters of this kind are used for bringing together melt strands composed of a thermoplastic material coming from a plurality of extruders, for example when producing films, plates, and boards. In this context, the individual melts of thermoplastic materials prepared by the extruders are conveyed against one another in the desired layer position in the coextrusion adapter and then together, are conveyed to the extrusion die for the production of the coextrusion composite.

In the layering of different plastics onto one another inside the coextrusion adapter, as is frequently the intended use in practice, it is necessary to compensate for different properties of the plastics, in particular different viscosities or also deviations in the selected mass flow conditions of the individual extruder.

A coextrusion adapter of this kind is known from European Patent Reference EP 1 621 320 A1.

When manufacturing multi-layered films with a coextrusion adapter of this kind, the layers that are conveyed against one another from a die connected downstream of the coextrusion adapter, frequently a sheet die, are extruded to produce the multi-layered film. Ideally, all of the layers emerge with a uniform, desired layer thickness across the entire width of the die. In practice, however, fluctuations in the layer thickness and in the resulting film quality occur in the edge regions, among other things due to viscosity differences and friction losses so that edge strips with a width of approx. 30 to 50 mm are not suitable for the end product and are cut off and preferably fed back directly into the extrusion. Depending on the raw material of the individual layers, however, this is disadvantageous since it has a negative impact on the reusability and/or since the raw material used can be very cost-intensive.

There have thus already been various proposals for the edge region that is to be cut away to be produced only out of less expensive, easily reusable plastics so that the actually desired multi-layered composite is encapsulated and is obtained in the desired configuration only after the edge trimming.

It is known from U.S. Pat. No. 5,120,484 A to feed the edge region of a sheet die from a separate melt conduit with a connected extruder for an edge polymer so that between the edge regions, the multi-layered composite can be extruded unimpeded and is available for use once the edge regions are cut off. This is very complex and inflexible. In particular, only constant widths of the edge strips and of the entire extrudate can be produced.

U.S. Pat. Nos. 4,784,815 and 4,289,560 disclose coextrusion adapters in which the melt stream flowing in the central conduit is united with separately supplied melt streams for the edge regions prior to the entry into the subsequent die, with the supplied melt streams for the edge regions pushing the melt stream flowing in the central conduit back from the edge. Systems of this kind with symmetrical composites, however, only function satisfactorily if all of the utilized raw materials of all layers have similar viscosities. But if they have different viscosities or temperatures or if the desired layered composite is asymmetrical, then layer boundary shifts frequently occur in the edge region and the multi-layered melt stream in the central conduit cannot be displaced out of the edge region, which leaves room for improvement.

European Patent Reference EP 0 315 304 A1 describes a coextrusion adapter in which between the central conduit and a coextrusion conduit, adjustable separating elements are provided, which have a smaller width than the central conduit and also, the coextrusion conduit is limited to a correspondingly narrower width than the central conduit. In this way, it is possible to produce symmetrical composites with an encapsulation at the edges, which is produced from the melt stream that has been previously supplied in the central conduit. The flexibility with regard to the selective displacement of individual or multiple layers of the multi-layered coextrusion composite to be produced, however, still leaves room for improvement.

SUMMARY OF THE INVENTION

One object of this invention is to modify a coextrusion adapter so that regardless of the sequence and number of layers placed on top of one another in the coextrusion adapter, individual or multiple layers can be reliably displaced from the edge region in a simple and flexible way and can be omitted from the edge trimming in order to increase both the reusability of the cut off edges and the economy of production.

To attain the stated object, this invention proposes the embodiment of a coextrusion adapter according to the features described in this specification and in the claims.

Advantageous embodiments and modifications of this invention are also discussed in this specification and in the claims.

The above and other objects of this invention are achieved if adjacent to the outlet end of the respective coextrusion conduit, in at least one of the side walls of the central conduit, a receiving bore is provided, into which it is possible to insert a displacing element that protrudes beyond the side wall into the central conduit.

According to this invention, it is thus possible to use the inward-protruding displacing element to selectively displace one or more layers of the extrudate flowing in the central conduit away from the side walls situated in the width direction and to fill the resulting empty space with the supplied melt from the coextrusion conduit in order to form the correspondingly desired coextrusion layer.

In this regard, regardless of the positioning of one or more unwanted layers in the edge region, it is possible to selectively displace them from the edge region. The unwanted layers can, for example, be difficult-to-reuse adhesive layers or very cost-intensive raw materials such as EVOH.

In one embodiment of this invention, the displacing element is embodied as a displacing bolt, such as with a cylindrical basic form, is inserted into a corresponding cylindrical receiving bore and at its end oriented toward the central conduit, has a displacing protrusion that protrudes a suitable amount into the central conduit and displaces the melt from the edges in the central conduit.

A range from approximately 1 to 10 mm, preferably approximately 2 to 4 mm, is considered to be a suitable dimension for the protrusion of the displacing protrusion into the central conduit. With a width of the central conduit of approximately 100 mm and a nozzle width of the subsequent sheet die of 2,000 mm, this results in an edge strip formation with selectively displaced layers of approximately 30 to 50 mm wide. Through the indicated range of approximately 1 to 10 mm for the protrusion of the displacing protrusion, it is possible to obtain suitable widths of the edge strips with nozzle widths of approximately 500 to 5,000 mm.

Furthermore, the receiving bore is preferably embodied so that it passes through the side wall in the form of a through bore and it is possible for the displacing element to be inserted into this through bore from the outside and in a sealed fashion. In this way, it is possible, for example, to adjust different-sized displacement regions or positionings, depending on the sequence of layers, while the system is not in operation after a product change by correspondingly exchanging displacing bolts for ones that have a displacing protrusion that protrudes by a different distance, without requiring a labor-intensive disassembly or cleaning of the entire coextrusion adapter.

In the event of unwanted displacement of the melt from the central conduit, it is also possible, at an outlet end of a coextrusion conduit, to insert a closing element into the receiving bore provided adjacent to the outlet end, which in lieu of a displacing bolt, only closes the receiving bore, but does not protrude into the central conduit, instead ending flush at the side wall.

It is also preferable if the two side walls of the central conduit have or are embodied with receiving bores that are flush with each other respectively adjacent to the outlet end of the coextrusion conduits so that both edge regions lying in the width direction are selectively processed in the above-described way and the corresponding melt is displaced at the edge.

At their ends facing the outlet end, the adjusting elements can have a wedge-shaped adjusting section whose one wedge surface faces the central conduit and whose other wedge surface faces the outlet end of the coextrusion conduit in order to be able to control the thickness of the supplied coextrusion layer, as is known from European Patent Reference EP 1 621 320 A1. Thus, with this invention it is possible for the wedge surface facing the central conduit to be placed against the protruding displacing element or against its displacing protrusion, thus further improving the selective displacement of the layer flowing in the central conduit.

BRIEF DESCRIPTION OF THE DRAWINGS

This invention is explained in greater detail below in view of exemplary embodiments shown in the drawings, wherein.

DETAILED DESCRIPTION OF THE INVENTION

Figure 1:
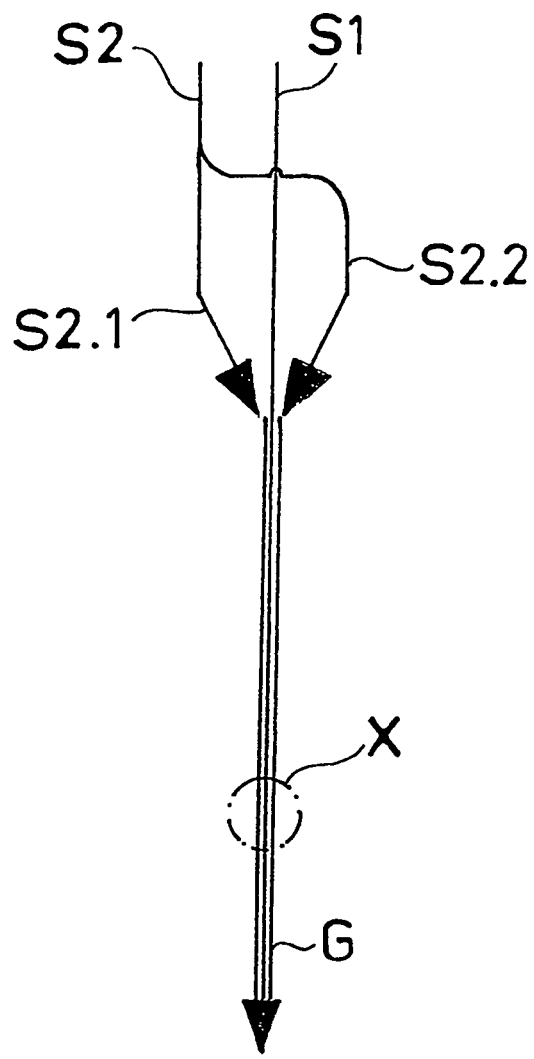
FIG. 1 shows a schematic depiction of a basic function of a coextrusion adapter according to this invention.

FIG. 1 shows a basic function of a coextrusion adapter for producing a multi-layered coextrusion composite out of a thermoplastic material. From two different extruders that are not shown in detail here, two different melt streams S1, S2 of or composed of the same or different thermoplastic materials are produced and supplied at high pressure to a coextrusion adapter. In this case, the melt stream S1 is supplied essentially in a straight line without deflection through a central conduit of the coextrusion adapter, which conduit will be explained in greater detail below, in the direction toward a die.

Figure 2:
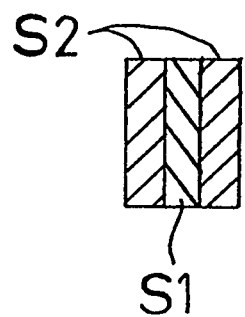
FIG. 2 shows an enlarged depiction of the detail X according to FIG. 1.

By contrast with this, the melt stream S2 is divided into two partial streams S2.1 and S2.2 and is supplied via coextrusion conduits on both sides to the stream S1 flowing in the central conduit and forming a three-layered composite as shown in FIG. 2 that are stacked on top of one another, with the melt streams S2 forming the outer layers and the melt stream S1 forming the inner layer of the thus produced overall stream G, which is subsequently supplied to the die, not shown, for example, a sheet die for producing a multi-layered film. Because of possible rheological differences in the individual plastics of the melt strands S1, S2 and/or different mass flows, a great deal of attention must be paid to the moment when the melt strands S1, S2 and S2.1 and S2.2 are brought together.

Figure 3:
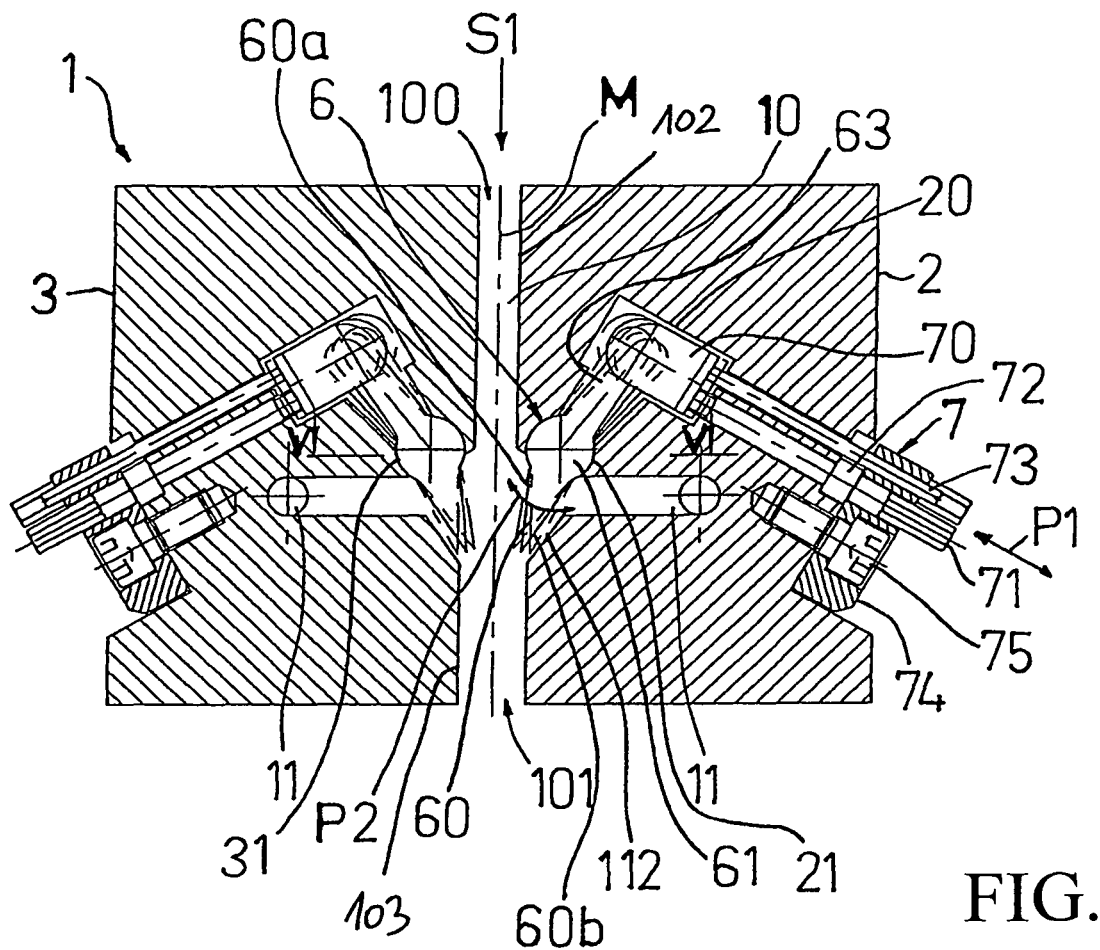
FIG. 3 shows a vertical sectional schematic diagram of the coextrusion adapter according to this invention.
Figure 4:
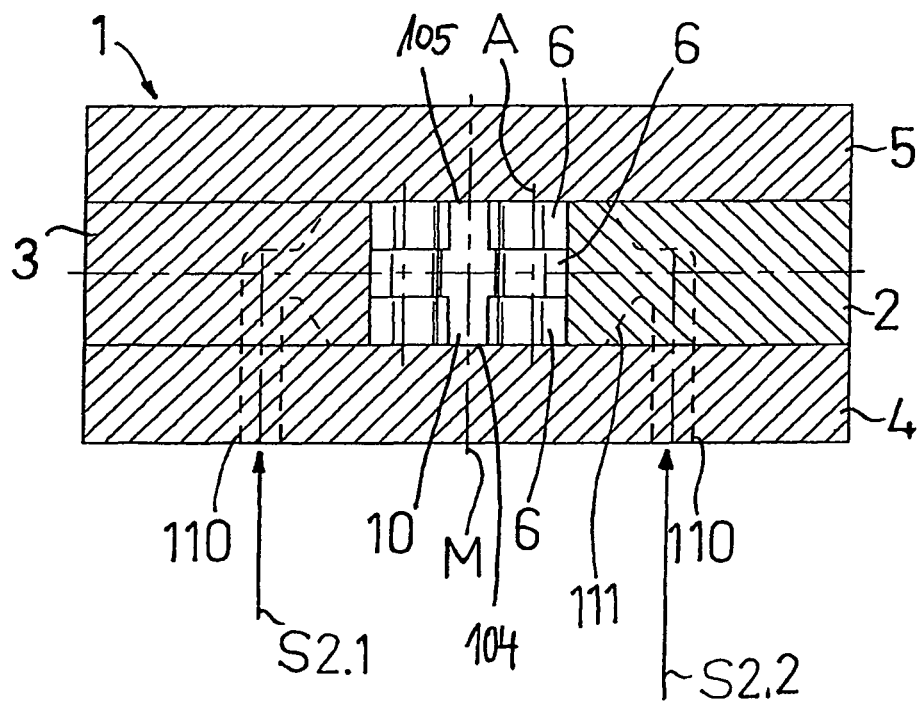
FIG. 4 shows a section taken through the coextrusion adapter according to this invention along the line V-V shown in FIG. 3.

FIGS. 3 and 4 show an exemplary embodiment of a coextrusion adapter 1, which is basically described above and includes two conduit parts 2, 3 that are spaced apart from each other, forming the central conduit 10, in each of which a respective coextrusion conduit 11 is formed. The conduit parts 2, 3 are embodied as mirror-symmetrical to the central axis of the central conduit 10 and delimit it in the vertical direction, forming a bottom wall 102 and corresponding top wall 103.

The two conduit parts 2, 3 are connected by side plates 4, 5, which simultaneously also form the side walls 104, 105 thereof, lying in the width direction of the central conduit 10. In this regard, the central conduit has a rectangular cross-section that is delimited by the bottom wall 102, the top wall 103, and the side walls 104, 105.

Because of an existing axial symmetry to the central axis M, it is now possible to explain other details based on one conduit part and the other components positioned therein. They correspondingly also apply to the mirror-symmetrically embodied other conduit part.

In accordance with the explanations relating to FIG. 1, the melt stream S1 conveyed by a first extruder enters into the central conduit 10 at an inlet end 100 and initially flows alone through this central conduit 10 to the region in which the two coextrusion conduits 11 in the side parts 2, 3 feed into the central conduit 10 with their respective outlet ends 112. The partial streams S2.1 and S2.2 of the melt stream S2 that have been previously divided by a dividing element, not shown here, first travel via inlet ends 110, for example, provided in the side part 4, into a distributing region 111 in which they are spread out to the entire width of the outlet end 112 and then across the entire width of the outlet end 112, travel into the central conduit 10 that is embodied with the same width. The melt streams S2.1 and S2.2 conveyed by the coextrusion conduits 11 enclose the melt stream S1, which has been previously supplied in the central conduit 10, on both sides so that the layered composite shown in FIG. 2 is produced, which then exits the central conduit 10 via the outlet end 101 at a connected die, not shown here, for producing a coextrusion composite. Correspondingly, in the supply region of the two coextrusion conduits 11, the central conduit 10 is embodied as stepped in order to have enough room for the supplied melt streams.

In order to compensate for fluctuations in the mass flow of the melt streams S1, S2 and possibly existing different rheological properties of the individual plastics, adjusting elements 6 that are associated with each outlet end 112 of the coextrusion conduits 11 are provided, which are positioned next to one another in the width direction of the outlet end 112 and in the width direction of the central conduit 10 that is embodied with the same width, as is particularly visible from the top view according to FIG. 4. In the exemplary embodiment shown, a total of three adjusting elements 6 are situated next to one another, or behind one another in the depiction according to FIG. 3, in order to cover the entire width of the outlet end 112 of the coextrusion conduits 11 and the entire width of the central conduit 10.

Each adjusting element 6 in this case, at its end oriented toward the outlet end 112, includes a wedge-shaped adjusting section 60, which comes to a point and tapers in the flow direction through the central conduit 10 and whose one wedge surface 60a faces the central conduit 10 and whose other wedge surface 60b faces the outlet end 112 of the coextrusion conduit 11. Consequently, the adjusting section 60 in the region of its two wedge surfaces 60a, 60b remains in contact with melt on both sides, namely in the region of the wedge surface 60a, it remains in contact with the melt being conveyed in the central conduit 10 and in the region of the wedge surface 60b, it remains in contact with the melt from the coextrusion conduit 11 emerging from the outlet end 112. The unification of the melt streams from the central conduit 10 and the coextrusion conduit 11 takes place at the wedge tip of the adjusting section 60.

In order to avoid an excessively sharp change in direction in this case, the outlet end 112 of the coextrusion conduit 11 is embodied as already inclined toward the flow direction through the central conduit 10.

Adjacent to the adjusting section 60, each adjusting element 6 then includes a cylindrically expanded bearing section 61 with which the adjusting elements 6 are inserted into corresponding recesses 21 in the respective conduit parts 2, 3 of the coextrusion adapter 1. This cylindrically expanded bearing section 61 is matched exactly to the recesses 21 in the conduit parts 2, 3 thus preventing melt from penetrating from the central conduit 10 and/or the coextrusion conduit 11 along the joint between the bearing section 61 and the recess 21, while at the same time ensuring that the bearing section and the adjusting section 60 formed onto it are able to pivot about the axis A that is visible in FIG. 4 and extends out in the width direction of the outlet ends 112 of the coextrusion conduit 11. In this case, the central axis of the bearing section 61 simultaneously constitutes or forms the pivot axis A.

The pivoting support of the bearing section 61 inside the conduit parts 2, 3 enables a pivoting motion of the wedge-shaped adjusting section 60 about the pivot axis A according to arrow P2.

This results in the fact that depending on the pivoting motion in the direction of arrow P2, the inner width of the respective width section of the outlet end 112 spanned by an adjusting section 60 can be enlarged or reduced and in corresponding opposition thereto, the inner width of the respective width section of the central conduit 10 can be reduced or enlarged.

Thus, if the inner width of the outlet end 112 is enlarged by pivoting the adjusting section 60 to the left in the direction of arrow P2 according to FIG. 3, then at the same time, the inner width of the central conduit 10 in this width section is correspondingly reduced and vice versa. This is due to the fact that the wedge surfaces 60a, 60b of the adjusting section 60 are in contact with the melt stream in the central conduit 10 on the one hand and with the melt stream in the coextrusion conduit 11 and its outlet end 112 on the other, thus enabling the corresponding alternating influence.

For the corresponding adjusting or pivoting of the adjusting sections 60, at the end of each adjusting element 6 oriented away from the adjusting section 60, an adjusting lever 63 is provided, which is operatively connected to an actuating drive 7.

The actuating drive 7 comprises or is composed of a threaded rod 71 that is positioned so that it extends out externally from the conduit parts 2, 3 of the coextrusion adapter 1, and, with the engagement of a rotating tool in the direction of arrow P1, can be screwed into or out of the respective conduit part 2 or 3. At its end oriented toward the adjusting element 6, the threaded rod 71 has a driving element 70, which is connected to the adjusting lever 63 so that by actuating the threaded rod 71 in the direction of arrow P1, it is possible to produce the desired pivoting motion of the adjusting element 60 in the direction of arrow P2.

The screwing in and out of the threaded rods 71 is made possible by a threaded nut 72, which is kept stationary by a counter plate 74 and screws 75 and through which the threaded rod 71 is screwed.

The respective movement path of the threaded rod 71 can also be directly read and assessed from the outside at any time by a measurement spindle 73 that is rigidly affixed to the driving element 70.

In order to achieve a sufficient mobility of the actuating drive 7 and adjusting element 6, the two conduit parts 2, 3 can each have or be provided with sufficiently large recesses 20, which receive the above-mentioned components in accordance with their possible movement.

Figure 5:
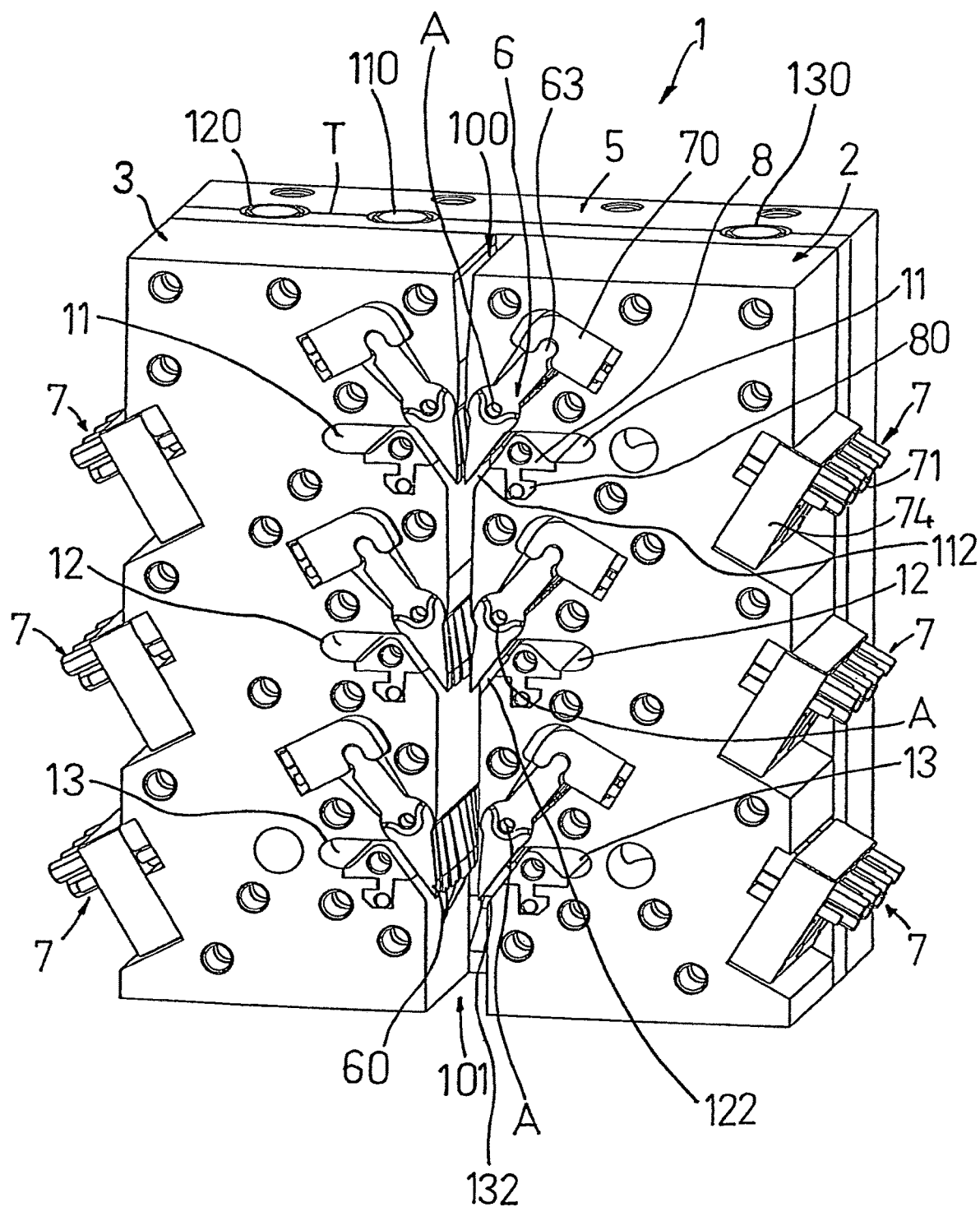
FIG. 5 is a perspective depiction of an embodiment of the coextrusion adapter according to this invention.
Figure 6:
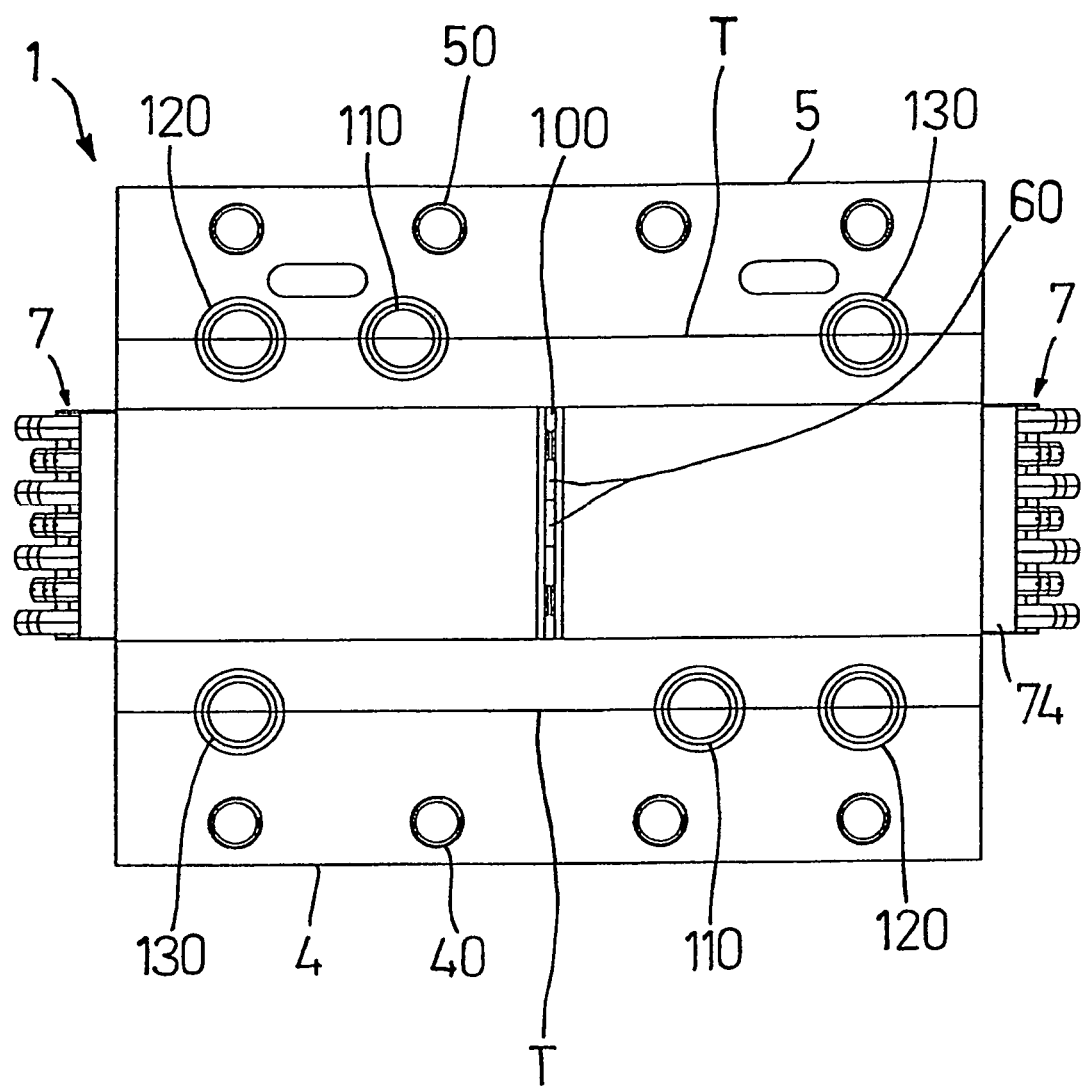
FIG. 6 shows a top view of the coextrusion adapter according to this invention according to FIG. 5.

FIGS. 5 and 6 show an embodiment of a coextrusion adapter in which parts of the coextrusion adapter, which has been described above and whose operating principle has been shown in FIGS. 3 and 4, that are the same have been provided with the same reference numerals and are not separately described again below, to avoid repetition.

By contrast with the coextrusion adapter shown in FIGS. 3 and 4, which has only one coextrusion conduit 11 in each conduit part 2, 3 so that on the whole, an at most three-layered coextrusion composite can be produced, the coextrusion adapter 1 shown in FIGS. 5 and 6 has three coextrusion conduits 11, 12, 13 in each of its conduit parts 2, 3, with corresponding outlet ends 112, 122, 132 positioned or situated one after the other in the flow direction through the central conduit 10 so that on the whole, an at most seven-layered coextrusion composite can be produced in this depicted coextrusion adapter 1, but this composite can also have even more layers or fewer layers with a corresponding variation of the coextrusion conduits.

The conduit parts 2, 3 are positioned between side parts 4, 5. In the depiction according to FIG. 5, the side part 4 is removed.

The configuration and embodiment of the conduit parts 2, 3 and the coextrusion conduits, adjusting elements, and actuating drives they contain have been selected to coincide with the embodiments in FIGS. 3 and 4 so that they are respectively embodied to be mirror-symmetrical to the central axis M extending through the central conduit 10 so that their embodiment can be explained by proxy based on one coextrusion conduit.

From the perspective depiction according to FIG. 5 and also the top view according to FIG. 6, it is clear that the respective adjusting elements 6 allocated to an outlet end 112, 122, 132 of the coextrusion conduits 11, 12, 13 can be embodied in different widths. The middle adjusting elements 6 have a greater width than the outer adjusting elements 6, which is particularly apparent from the adjusting sections of the coextrusion conduit 13 labeled with the reference numeral 60. Preferably, the adjusting sections 60 can have a width of 5-30 mm, in particular 10-25 mm.

During operation of the coextrusion adapter shown in FIGS. 5 and 6, a melt stream S1 first travels via an inlet end 100 into the central conduit 10, whereupon melt streams conveyed in the conduit parts 2, 3 via the coextrusion conduits 11 are applied to it from the outside. The melt stream, which now has three layers and is conveyed in a correspondingly widened section of the central conduit 10, then has another outer layer from the coextrusion conduits 12 applied to it on each side and after this, the now five-layered coextrusion composite then once again has another outer layer from the coextrusion conduits 13 applied to it so that altogether, a seven-layered coextrusion composite is formed and can be supplied via the outlet end 101 to a die that is not shown. In this case, in the above-described way, the individual adjusting elements 6 provided at the outlet ends 112, 122, 132 of the coextrusion conduits 13 enable an individual profiling, which can be different as needed across the width direction, of the respective incoming melt stream from the coextrusion conduits 11, 12, 13 and a simultaneous, opposite profiling of the melt stream traveling in the central conduit 10.

The respective supply of the individual melts to the inlet end 100 of the central conduit and the coextrusion conduits 11, 12, 13 is particularly apparent from the top view according to FIG. 6.

By an adapter that is connected upstream of the coextrusion adapter 1, but not shown here, a first melt stream travels from a first extruder directly to the open inlet end 100 of the central conduit 10 and from there, travels into the coextrusion adapter 1 from the top.

The melts to be supplied to the coextrusion conduits 11, 12, 13 in the respective conduit parts 2, 3 are each introduced into the coextrusion adapter 1 via inlet ends 110, 120, 130 and travel via an internal conduit system into a distributing region which is not shown separately here, but has been explained in connection with FIGS. 3 and 4, from which the respective melt travels to the outlet end 112, 122, 132 of the coextrusion conduits 11, 12, 13 and finally into the central conduit 10. In order to compensate for possibly existing rheological differences between the individual melts, upstream of each outlet end 112, 122, 132 of the coextrusion conduits 11, 12, 13, damming elements 8 are provided, over which the melts are conveyed before entry into the respective outlet end 112, 122, 132. Through selection of an appropriate contour, these damming elements 8 can be individually adapted to the respective rheological properties of the supplied plastic melt and the mass flow and, by formed-on base parts 80, are interchangeably secured in corresponding insertion grooves of the conduit parts 2, 3 so that a respective individual adaptation to the processed thermoplastic materials can take place.

In order to be able to produce the conduit system already mentioned above from the inlet ends 110, 120, 130 to the outlet ends 112, 122, 132 in a particularly simple fashion, the inlet ends 110, 120, 130 and the continuing conduit section in the region of the interstices T between the side parts 4, 5 and the conduit parts 2, 3 are each inserted half-way so that they can be produced for a low production cost during the production of the side parts 4, 5 and conduit parts 2, 3 by milled slots in the respective surface oriented toward the subsequent interstice T. In this way, when forming the inlet ends 110, 120, 130 and the subsequent conduit sections of the respective coextrusion conduits 11, 12, 13, it is possible to eliminate the use of complex methods such as erosion.

Figure 9:
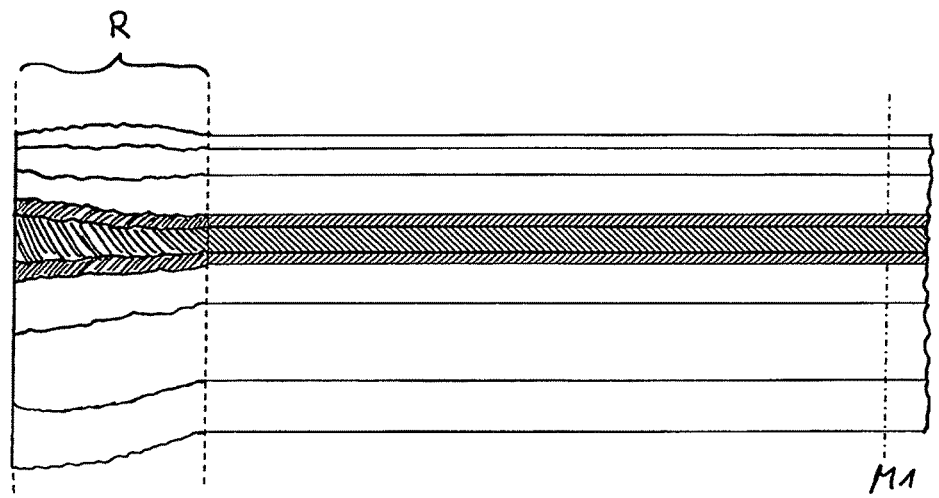
FIG. 9 shows a schematic section taken through a coextrusion composite according to the prior art.

For a coextrusion composite produced by coextrusion adapters of this kind, for example a multi-layered coextruded film, it is characteristic for the film to have a cross-section that is visible in FIG. 9, in which, due to viscosity fluctuations and/or friction losses, and the like, the edge regions R lying on both sides of the central axis M1 do not achieve the desired thickness tolerance and in this regard, are not usable for the desired end product. Since this has been technically unavoidable up to this point, the edge regions R are cut off with a width of approximately 30 to 50 mm and are preferably reused, while the remaining film satisfies the specifications.

But if individual layers that are shown by way of example with hatching in FIG. 9 can only be reused with difficulty, such as adhesive layers, or are of or composed of costly raw materials such as EVOH, then this edge trimming is accompanied by corresponding disadvantages.

Figure 10:
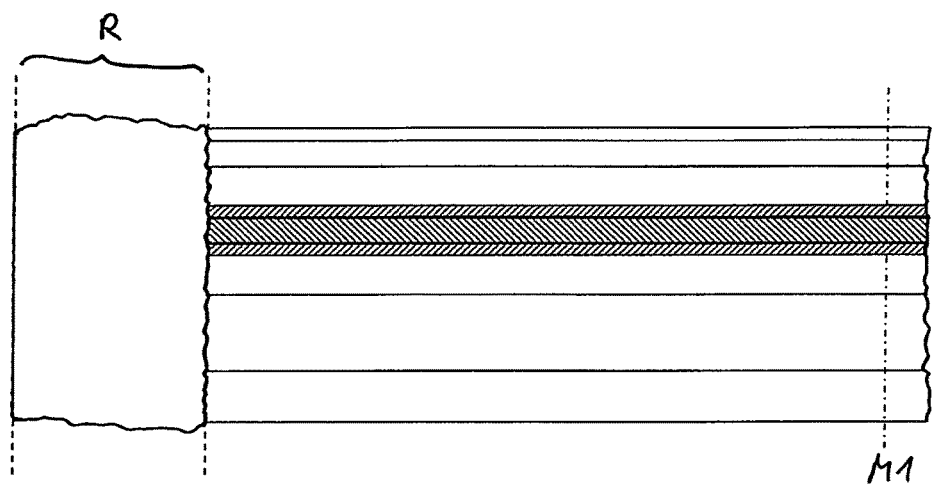
FIG. 10 shows another schematic section taken through a coextrusion composite according to the prior art.

In the event that largely similar properties of all of the layers are present, then it is possible, for example, to perform an encapsulation with a suitable edge material, as shown in FIG. 10. Such a solution, however, is not possible with large differences in viscosity and/or temperature of the individual layers and their raw materials.

Figure 7:
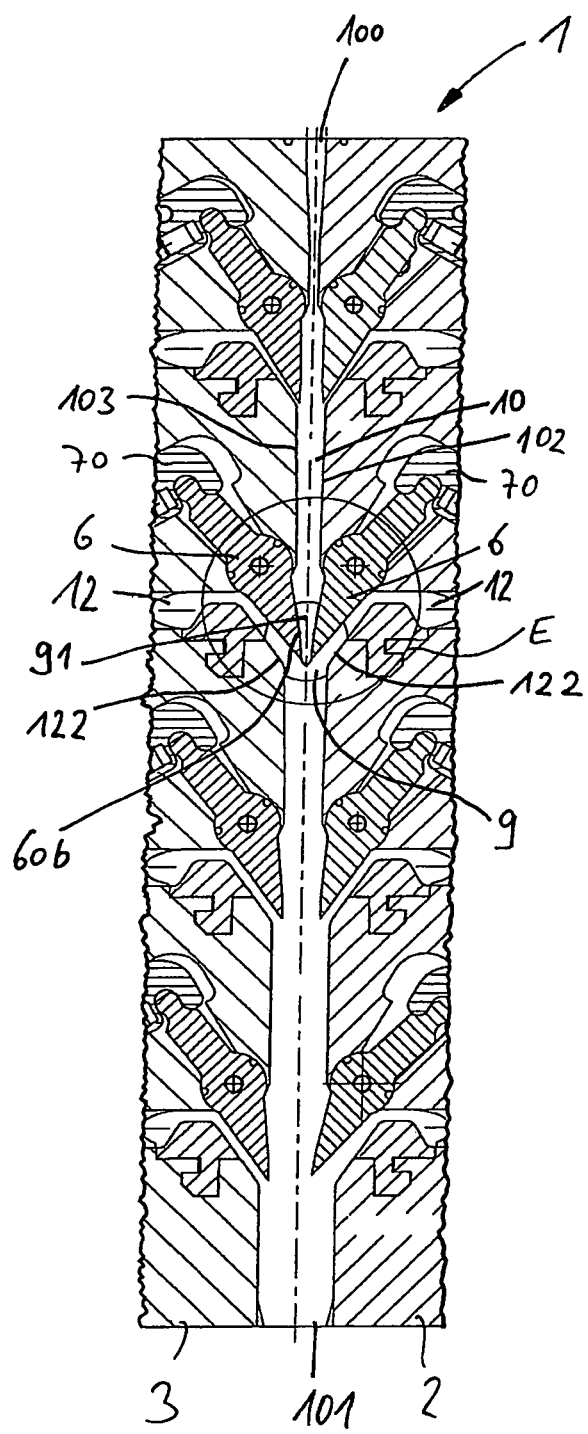
FIG. 7 shows a sectional view extending through the central conduit of the coextrusion adapter according to this invention according to FIG. 5.
Figure 8:
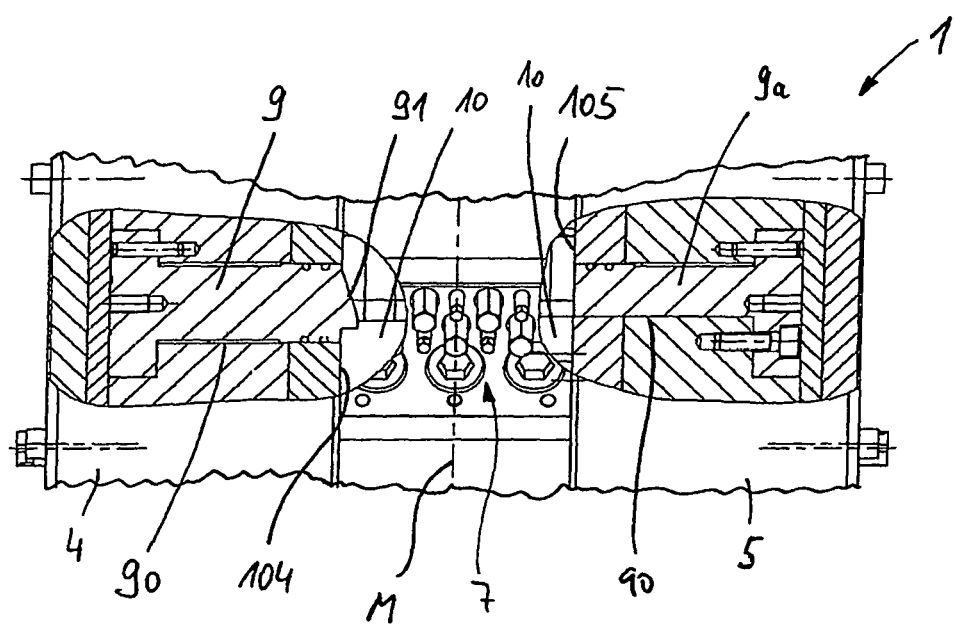
FIG. 8 shows a partial section taken through the coextrusion adapter according to FIG. 5 in an orientation that is rotated by 90° relative to FIG. 7.

In the coextrusion adapter 1 shown in the drawings, in the region labeled reference letter E in FIG. 7 of the infeed of one, several, or all of the coextrusion conduits 11, 12, 13, described here by proxy based on the coextrusion conduit 12, receiving bores 90 that are flush with one another are introduced into the central conduit 10 in the side walls 104, 105 thereof, adjacent to the outlet end 122. Displacing elements 9 in the form of displacing bolts are inserted into these receiving bores 90 and sealed by seals that are not shown. At their end oriented toward the central conduit 10, they have a displacing protrusion 91 that protrudes into this central conduit by approximately 3 to 5 mm here, and also see the depiction in FIG. 8, to the left of the central axis M.

The displacing protrusion 91 rises in wedge-shaped fashion in the flow direction of the central conduit 10 and the wedge surface 60a of the adjusting element 60 oriented toward the central conduit 10 is positioned so that it rests against the displacing protrusion 91.

The displacing protrusion 91 that protrudes into the central conduit by the corresponding amount makes it possible, in a selective fashion by choosing the appropriate receiving bore 90 and by appropriately dimensioning the displacing protrusion 91, to mechanically and reliably displace the melt flowing in the central conduit 10 away from the edge region of the central conduit 10 before the application of the melt stream coming from the corresponding coextrusion conduit 10, 11, 12 so that the empty space produced at the edge is immediately occupied by the incoming melt flowing from the respective coextrusion conduit.

Figure 11:
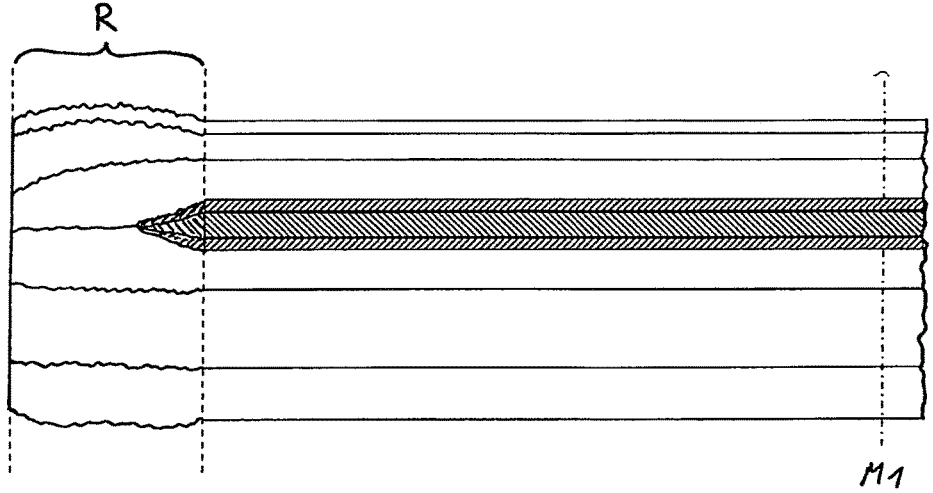
FIG. 11 shows a schematic section taken through a coextrusion composite according to this invention.

As a result, it is thus possible, as clear from FIG. 11, to selectively displace from the edge region R individual or multiple layers that are not wanted in the edge trimming, regardless of the symmetry and layer sequence of the entire coextrusion composite and regardless of the rheology of the individual layers, and to inexpensively and simply reuse the edge region R.

For this purpose, it is naturally preferable for the receiving bores 90 that are flush with one another adjacent to one of the coextrusion conduits 10, 11, 12 to be equipped with congruently embodied displacing elements 9, though this is not absolutely necessary. Alternatively, it is also possible, as shown by way of example in FIG. 8, to the right of the central axis M, to close the receiving bore by a closing element 9a that is embodied similarly to the displacing bolt 9, but that does not protrude into the central conduit 10, instead ending flush with the side wall 105. This is advisable, for example, if no displacement of individual layers from the edge region of the central conduit 10 is to take place in the region of the supply of melt from the corresponding coextrusion conduit 10, 11, 12 into the central conduit.

In any case, the receiving bores 90 are embodied as through bores in the side plates 4, 5 and pass through them so that after removal of covers that are not shown in detail, for example when the system is not in operation, it is possible to exchange displacing bolts 9 and/or closing bolts 9a from the outside without disassembling the coextrusion adapter and to adapt to altered production requirements, for example in that displacing bolts 9 with a differently dimensioned displacing protrusion 91 are used or in that displacing bolts 9 are exchanged for closing bolts 9a or closing bolts 9a are exchanged for suitable displacing bolts 9.

The drawing according to FIG. 6 also shows still further bores 40, 50 in the side parts 4, 5, in which temperature control elements can be accommodated and/or adapters for the extruders can be mounted.

Naturally, the individual inlet ends 110, 120, and 130 of the coextrusion conduits 11, 12, 13 embodied in both conduit parts 2, 3 and arranged mirror-symmetrically relative to one another can each be supplied with a melt stream that comes from an extruder and is also divided according to FIG. 1 and it is equally possible to respectively supply each inlet end 110, 120, 130 of a coextrusion conduit 11, 12, 13 in the two side parts 2, 3 with different melt streams from separate extruders.

Finally, when not in use, it is also possible to seal individual coextrusion conduits 11 off from the central conduit 10 by correspondingly closing the outlet end 112, 122, 132 by a corresponding movement of the adjusting elements 6 and it is also possible to seal the adjacent receiving bores 9 by closing elements 9a so that despite the fact that in this case, six coextrusion conduits 11, 12, 13 are provided for the correspondingly seven-layer coextrusion composites, it is also possible to produce coextrusion composites with a smaller number of layers and to use the adjusting elements 6 and the closing elements 9a to simply close the coextrusion conduits 11 that are not needed for this process. This minimizes changeover times in the coextrusion adapter 1.

European Patent Application EP 16159939.4, filed 11 Mar. 2016, the priority document corresponding to this invention, to which a foreign priority benefit is claimed under Title 35, United States Code, Section 119, and its entire teachings are incorporated, by reference, into this specification.

What is claimed is:

1. A coextrusion adapter, comprising:
a central conduit (10) configured to include a melt stream and formed between two opposing conduit parts (2, 3) connected by opposing side plates (4, 5), the central conduit (10) having an inlet end (100) and an outlet end (101), bottom and top walls (102, 103) formed by the two opposing conduit parts (2, 3) and that define a height of the central conduit (10), and side walls (104, 105) formed by the opposing side plates (4, 5) and that define a width of the central conduit (10);
at least one coextrusion conduit (11, 12, 13) having an inlet end (110, 120, 130) and an outlet end (112, 122, 132);
the outlet end (112, 122, 132) feeding into the central conduit (10) through the bottom and/or the top wall (102, 103) thereof, downstream of the inlet end (100) of the central conduit (10), and adjusting devices are allocated to each outlet end (112, 122, 132) of the at least one coextrusion conduit (11, 12, 13) and are of a plurality of adjusting elements (6), which collectively extend across a width section of the outlet end (112, 122, 132) and by actuating drives (7) are adjustable independently of one another so it is possible to change an inner width of the respective width section of the outlet end (112, 122, 132);
a receiving bore (90) in at least one of the opposing side plates (4, 5), the receiving bore transverse to the at least one coextrusion conduit (11, 12, 13) and open to the central conduit (10) through a corresponding one of the side walls (104, 105) and adjacent to the outlet end (112, 122, 132);
a removable closing element (9a) insertable into the receiving bore (90) and that ends flush with the corresponding one of the side walls (104, 105); and
a removable displacing element (9) insertable into the receiving bore (90) and that protrudes beyond the corresponding one of the side walls (104, 105) into the central conduit (10), wherein the removable displacing element is configured to displace a first edge of the melt stream in the central conduit (10) inward from a second edge of a coextrusion melt stream, and the removable displacing element (9) is replaceable with the closing element (9a) ending flush with the corresponding one of the side walls (104, 105).

2. The coextrusion adapter according to claim 1, wherein the two side walls (104, 105) are embodied with receiving bores (90) that are aligned flush with one another.

3. The coextrusion adapter according to claim 2, wherein ends facing the outlet end (112, 122, 132), the adjusting elements (6) have a wedge-shaped adjusting section (60) with one wedge surface (60a) that faces the central conduit (10) and an other wedge surface (60b) that faces the outlet end (112, 122, 132) of the coextrusion conduit (11, 12, 13) and the wedge surface (60a) facing the central conduit (10) can be placed against the protruding displacing element (9).

4. The coextrusion adapter according to claim 1, wherein ends facing the outlet end (112, 122, 132), the adjusting elements (6) have a wedge-shaped adjusting section (60) with one wedge surface (60a) that faces the central conduit (10) and an other wedge surface (60b) that faces the outlet end (112, 122, 132) of the coextrusion conduit (11, 12, 13) and the wedge surface (60a) facing the central conduit (10) can be placed against the protruding displacing element (9).

5. The coextrusion adapter according to claim 1, wherein the displacing element (9) comprises a displacing bolt with a displacing protrusion (91) that protrudes into the central conduit (10).

6. The coextrusion adapter according to claim 1, wherein the receiving bore (90) passes through the corresponding one of the side walls (104, 105) and through the at least one of the opposing side plates (4, 5), and each of the displacing element (9) and the closing element (9a) is configured to be inserted into the receiving bore (90) from an outside of the coextrusion adapter in a sealed fashion.

7. The coextrusion adapter according to claim 1, wherein the displacing element (9) comprises a displacing bolt with a displacing protrusion (91) that protrudes into the central conduit (10) and rests against one of the adjusting elements (6).

8. The coextrusion adapter according to claim 7, further comprising a second removable displacing element, wherein the removable displacing element (9) or the closing element (9a) is replaceable with the second removable displacing element, and the second removable displacing element has a second displacing protrusion with a dimension different from the displacing protrusion (91).

9. A coextrusion adapter, comprising:
   a central conduit (10) formed between two opposing conduit parts (2, 3) connected by opposing side plates (4, 5), the central conduit (10) having an inlet end (100) and an outlet end (101), bottom and top walls (102, 103) formed by the two opposing conduit parts (2, 3) and that define a height of the central conduit (10), and side walls (104, 105) formed by the opposing side plates (4, 5) and that define a width of the central conduit (10);
   a coextrusion conduit (11, 12, 13) having an inlet end (110, 120, 130) and an outlet end (112, 122, 132), the outlet end (112, 122, 132) feeding into the central conduit (10) through the bottom and/or the top wall (102, 103) thereof, downstream of the inlet end (100) of the central conduit (10);
   an adjusting device allocated to the outlet end (112, 122, 132) of the coextrusion conduit (11, 12, 13), the adjusting device configured to change an inner width of a respective width section of the outlet end (112, 122, 132);
   a receiving bore (90) in at least one of the opposing side plates (4, 5), the receiving bore transverse to the coextrusion conduit (11, 12, 13), open to the central conduit (10) through a corresponding one of the side walls (104, 105), and adjacent to the outlet end (112, 122, 132); and
   a removable displacing element (9) insertable into the receiving bore (90) and including a protrusion (91) that protrudes beyond the corresponding one of the side walls (104, 105) into the central conduit (10), wherein the adjusting device rests against the protrusion (91) to reduce the width of the central conduit (10), and the removable displacing element (9) is replaceable with a closing element (9a) ending flush with the corresponding one of the side walls (104, 105).

10. The coextrusion adapter according to claim 9, wherein the protrusion (91) is configured to displace an edge of a melt stream of the central conduit (10) from an edge of a coextrusion melt stream.

11. The coextrusion adapter according to claim 9, further comprising:
   a second coextrusion conduit (12, 13) feeding into the central conduit (10) through the bottom and/or the top wall (102, 103) thereof, downstream of the coextrusion conduit;
   a second adjusting device allocated to the second coextrusion conduit (12, 13);
   a second receiving bore (90) in at least one of the opposing side plates (4, 5), the second receiving bore transverse to the second coextrusion conduit (12, 13), open to the central conduit (10) through a corresponding one of the side walls (104, 105), and adjacent to a second outlet end (122, 132) of the second receiving bore (90); and
   the removable displacing element (9) or a second removable displacing element insertable into the second receiving bore (90), and the removable displacing element (9) or the second removable displacing element is replaceable with the closing element (9a) or a second closing element ending flush with the corresponding one of the side walls (104, 105).

* * * * *

UNITED STATES PATENT AND TRADEMARK OFFICE
CERTIFICATE OF CORRECTION

Page 1 of 1

PATENT NO. : 10,843,397 B2
APPLICATION NO. : 15/442902
DATED : November 24, 2020
INVENTOR(S) : Kaun et al.

It is certified that error appears in the above-identified patent and that said Letters Patent is hereby corrected as shown below:

On the Title Page

Replace "(73) Assignee: REINFENHAUSER GMBH & CO. KG MASCHINENFABRIK" with
-(73) Assignee: REIFENHÄUSER GMBH & CO. KG MASCHINENFABRIK- Signed and Sealed this
Twelfth Day of April, 2022

Drew Hirshfeld
*Performing the Functions and Duties of the*
*Under Secretary of Commerce for Intellectual Property and*
*Director of the United States Patent and Trademark Office*